United States Patent
Brinas (10) Patent No.: US 9,895,961 B2
(45) Date of Patent: Feb. 20, 2018

(54) AIRFLOW OUTLET

(71) Applicant: GM GLOBAL TECHNOLOGY OPERATIONS LLC, Detroit, MI (US)

(72) Inventor: Gerard Alan Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 700 days.

(21) Appl. No.: 14/535,511

(22) Filed: Nov. 7, 2014

(65) Prior Publication Data

US 2016/0129761 A1   May 12, 2016

(51) Int. Cl.
    B60H 1/34   (2006.01)
(52) U.S. Cl.
    CPC .................. B60H 1/3421 (2013.01)
(58) Field of Classification Search
    CPC .................. B60H 1/3421; B60H 1/34
    USPC .................. 454/152, 154, 155
    See application file for complete search history.

(56) References Cited

U.S. PATENT DOCUMENTS

| | | | | |
|---|---|---|---|---|
| 5,613,400 A * | 3/1997 | Sato | .................. | F16H 25/2204 188/378 |
| 6,159,092 A * | 12/2000 | Elder | .................. | B60H 1/3421 454/152 |
| 6,533,655 B2 * | 3/2003 | Demerath | .................. | B60H 1/3421 454/155 |
| 6,736,719 B1 * | 5/2004 | Gehring | .................. | B60H 1/3421 454/143 |
| 6,830,511 B2 * | 12/2004 | Gehring | .................. | B60H 1/3421 454/152 |
| 6,863,603 B2 * | 3/2005 | Demerath | .................. | B60H 1/3421 454/155 |
| 6,893,338 B2 * | 5/2005 | Katagiri | .................. | B60H 1/3421 454/155 |
| 6,932,695 B1 * | 8/2005 | Zielinski | .................. | B60H 1/3428 454/143 |
| 7,056,203 B2 * | 6/2006 | Shibata | .................. | B60H 1/3428 454/155 |

(Continued)

FOREIGN PATENT DOCUMENTS

| | | |
|---|---|---|
| CN | 101934708 A | 1/2011 |
| CN | 103162370 A | 6/2013 |
| CN | 103770602 A | 5/2014 |

(Continued)

*Primary Examiner* — Gregory Huson
*Assistant Examiner* — Dana Tighe
(74) *Attorney, Agent, or Firm* — Quinn IP Law (57) ABSTRACT

An airflow outlet comprising at least a first plurality of airflow direction elements, a second plurality of airflow direction elements, and an actuation system is provided. Each of the respective first airflow direction elements and second airflow direction elements include a vane shaft and at least one vane element disposed along the vane shaft and integrally coupled thereto. The actuation system is configured to control the position of the vane elements of each of the airflow direction elements. The actuation system includes a drive element engaged with the driven element, which is further engaged with the vane shafts of each of the airflow direction elements. A rotation of the drive element causes a proportional rotation of the vane elements of the each of the airflow direction elements to an operating position, which defines an airflow direction through the airflow outlet.

11 Claims, 7 Drawing Sheets

(56) References Cited

U.S. PATENT DOCUMENTS

2002/0021282 A1\* 2/2002 Masudaya ............ B60R 16/005
　　　　　　　　　　　　　　　　　　　　　345/156
2015/0202946 A1\* 7/2015 Inagaki ................ B60H 1/3428
　　　　　　　　　　　　　　　　　　　　　454/154

FOREIGN PATENT DOCUMENTS

| DE | 19531248 C2 | 12/1997 |
| DE | 19853095 C2 | 7/2002 |

\* cited by examiner

AIRFLOW OUTLET

TECHNICAL FIELD

The disclosure relates to an airflow outlet, particularly to an airflow outlet incorporated in the Heating, Ventilation, and Air Conditioning (HVAC) system of a vehicle.

BACKGROUND

Conventional vehicle interior passenger compartments include airflow systems for passenger comfort. These airflow systems deliver heated, cooled, or ambient air into the passenger compartment of the vehicle through airflow outlets.

The direction of the airflow through the outlets is generally manually controllable through the use of multiple sets of directional vanes, including at least a primary set of vanes and a secondary set of vanes. The vanes are generally manually adjusted via a user-controlled knob and complex linkage system.

SUMMARY

An airflow outlet is provided. The airflow outlet may be configured for use within the HVAC system of a vehicle and designed to facilitate airflow to a vehicle passenger compartment. The airflow outlet comprises at least a first plurality of airflow direction elements, a second plurality of airflow direction elements, and an actuation system.

Each of the respective airflow direction elements of the first plurality of airflow direction elements and each of the respective airflow direction elements of the second plurality of airflow direction elements include a vane shaft and at least one vane element. Each vane shaft has a first end and a second end. Each at least one vane element is disposed along the vane shaft and integrally coupled thereto between the first end and the second end.

The actuation system is configured to control the position of the vane elements of each of the airflow direction elements of the first plurality of airflow direction elements and the second plurality of airflow direction elements. The actuation system includes a drive element and a driven element engaged with one another. The drive element is engaged with the driven element and is configured to be rotated about a fixed drive element interior point. The driven element is actively engaged with the drive element and further engaged with the vane shafts of each of the airflow direction elements of each of the first plurality of airflow direction elements and the second plurality of airflow direction elements.

The rotation of the drive element in a first direction results in a rotation of the driven element in a second direction, which is rotationally opposite the first direction. The rotation of the driven element causes a resultant rotation of the vane shafts engaged therewith. As such, a rotation of the drive element actuates the at least one vane element of each of the airflow direction elements to an operating position. The operating position of the at least one vane element of each of the respective airflow direction elements defines an airflow direction through the airflow outlet.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
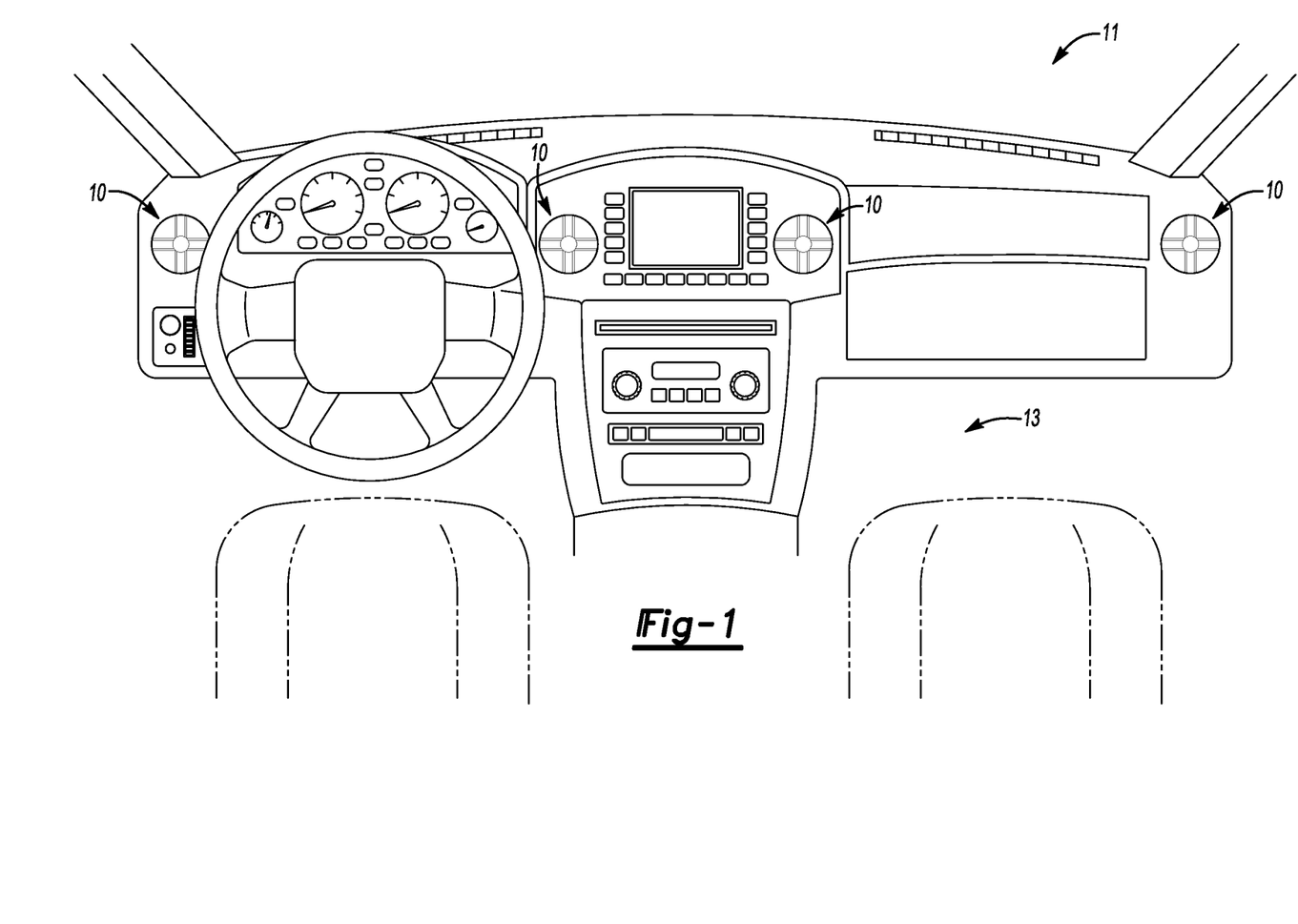
FIG. 1 is a schematic view of the passenger compartment of a vehicle containing a plurality of airflow outlets of the present disclosure.

Referring to the Figures, wherein like reference numbers correspond to like or similar components throughout the several views, an airflow outlet 10 is provided. As shown in FIG. 1, the airflow outlet 10 may be configured for use within the HVAC system of a vehicle 11. A plurality of outlets 10 may be arranged throughout a passenger compartment 13 of a vehicle 11 in order to facilitate airflow to the passenger compartment 13.

Figure 2:
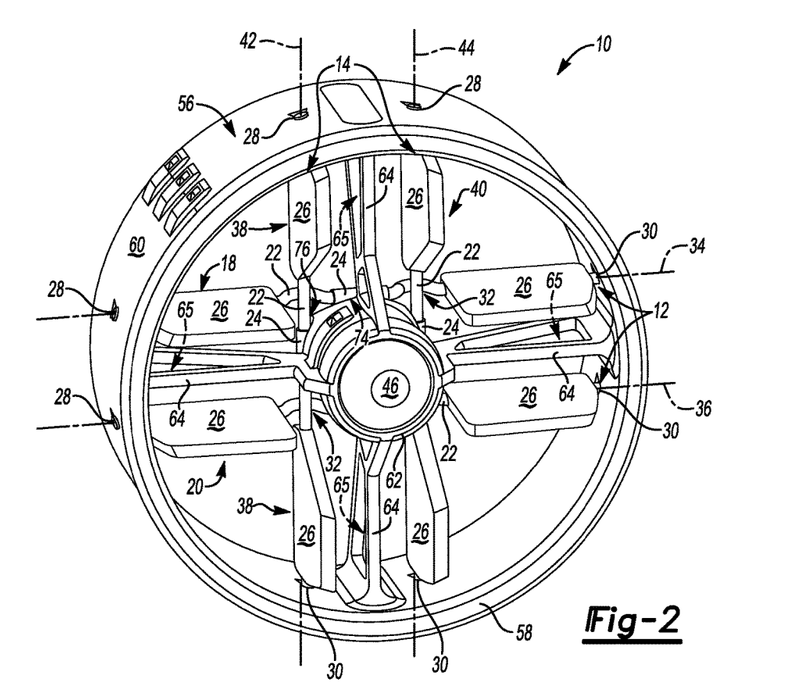
FIG. 2 is a schematic perspective view of the airflow outlet of the present disclosure, wherein the airflow outlet has a first plurality of airflow direction elements and a second plurality of airflow direction elements.
Figure 3:
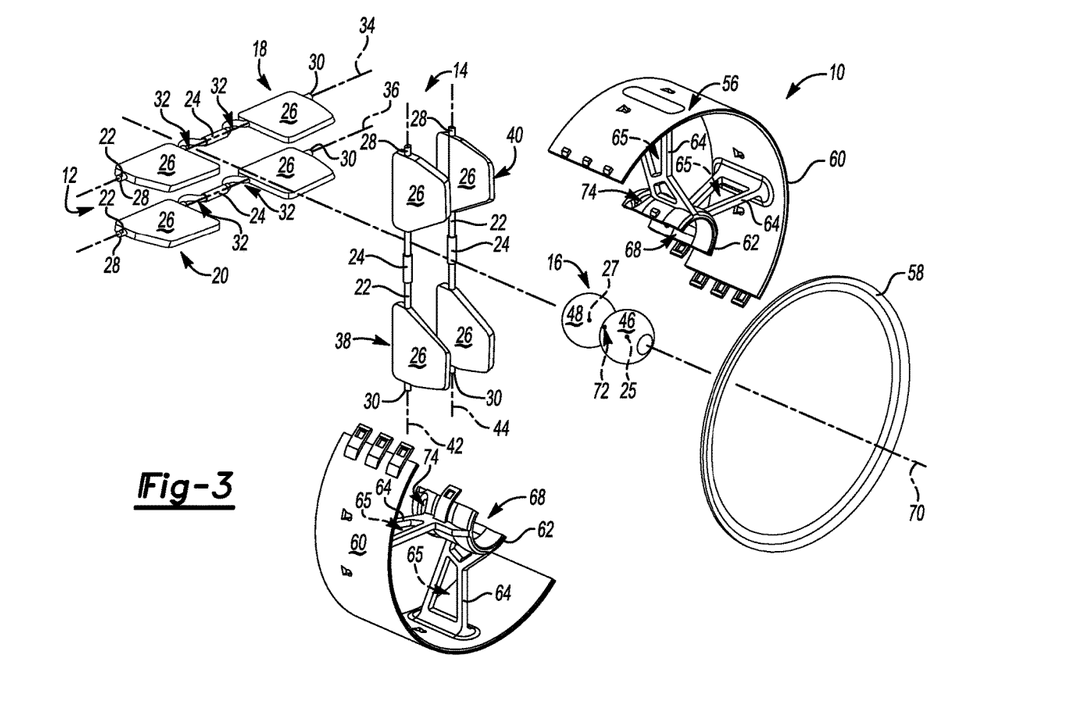
FIG. 3 is a schematic, exploded, perspective view of the airflow outlet described in the present disclosure.

As shown in the Figures, the airflow outlet 10 may generally include a first plurality of airflow direction elements 12, a second plurality of airflow direction elements 14, and an actuation system 16. Referring specifically to FIGS. 2 and 3, each of the respective airflow direction elements of the first plurality of airflow direction elements 12 may include a vane shaft 22, a vane shaft roller 24, and at least one vane element 26. The vane shaft 22 may be formed as a pin, rod, or the like. The vane shaft 22 may be composed of a polymeric material, a metallic material, or another suitable material. The vane shaft 22 may have a first end 28 and a second end 30. The vane shaft 22 of each of the first plurality of airflow direction elements 12 may define at least two detents 32, as detailed further herein below.

Each of the first plurality of airflow direction elements 12 may further include at least one vane shaft roller 24. The at least one vane shaft roller 24 may be disposed about the respective vane shaft 22 of one of the first plurality of airflow direction elements 12 and further positioned intermediately between the vane shaft first end 28 and the vane shaft second end 30. The vane shaft roller 24 may be further positioned between the at least two detents 32. The vane shaft roller 24 may be composed of a frictional material such as a rubberized material or the like.

Each of the first plurality of airflow direction elements 12 may further include at least one vane element 26. The at least one vane element 26 may be integrally coupled with and disposed along the vane shaft 22 of the associated airflow direction element. The at least one vane element 26 may be integrally coupled with the vane shaft 22 of the respective airflow direction element between the vane shaft first end 28 and the vane shaft second end 30. The vane element 26 may be a solid vane element 26 configured to divert airflow through the airflow outlet, i.e., air may not pass through the vane element 26. The vane element 26 may be formed in a polygonal shape such as a rectangle parallelogram, trapezoid, rhombus, square, or the like. In the example embodiment shown in the figures, the at least one vane element 26 of each of the first plurality of airflow direction elements 12 may be further defined as a pair of vane elements 26, wherein the first vane element 26 is disposed between the vane shaft first end 28 and one of the at least two detents 32 and the second vane element 26 is disposed between the vane shaft second end 30 and the other one of the at least two detents 32.

The first plurality of airflow direction elements 12 may be a plurality of horizontally oriented airflow direction elements. The first plurality of airflow direction elements 12 may include at least a first airflow direction element 18 and a second airflow direction element 20. Each of the respective airflow direction elements 18, 20 of the first plurality of airflow direction elements 12 may be positioned along a vane element axis 34, 36. The first airflow direction element 18 may be positioned at its vane shaft 22 along a first vane element axis 34. The second airflow direction element 20 may be positioned at its vane shaft 22 along a second vane element axis 36.

Referring again to FIGS. 2 and 3, each airflow direction elements of the second plurality of airflow direction elements 14 may include a vane shaft 22, a vane shaft roller 24, and at least one vane element 26. The vane shaft 22 may be formed as a pin, rod, or the like. The vane shaft 22 may be composed of a polymeric material, a metallic material, or another suitable material. The vane shaft 22 may have a first end 28 and a second end 30.

Each of the second plurality of airflow direction elements 14 may further include at least one vane shaft roller 24. The at least one vane shaft roller 24 may be disposed about the respective vane shaft 22 of one of the second plurality of airflow direction elements 14 and further positioned intermediately between the vane shaft first end 28 and the vane shaft second end 30. The vane shaft roller 24 may be composed of a frictional material such as a rubberized material or the like.

Each of the second plurality of airflow direction elements 14 may further include at least one vane element 26. The at least one vane element 26 may be integrally coupled with and disposed along the vane shaft 22 between the vane shaft first end 28 and the vane shaft second end 30. The vane element 26 may be a solid vane element 26 configured to divert airflow through the airflow outlet 10, i.e., air may not pass through the vane element 26. The vane element 26 may be formed in a polygonal shape such as a rectangle parallelogram, trapezoid, rhombus, square or the like. In the example embodiment shown in the figures, the at least one vane element 26 of each of the second plurality of airflow direction elements 14 may be further defined as a pair of vane elements 26, wherein one of the vane elements 26 is disposed between the vane shaft first end 28 and the vane shaft second end 30 proximal to the vane shaft first end 28 and the other one of the vane elements 26 is disposed between the vane shaft first end 28 and the second end 30, proximal to the vane shaft second end 30.

The second plurality of airflow direction elements 14 may be a plurality of vertically oriented airflow direction elements. The second plurality of airflow direction elements 14 may include at least a third airflow direction element 38 and a fourth airflow direction element 40. Each of the respective airflow direction elements 38, 40 of the second plurality of airflow direction elements 14 may be positioned along a vane element axis 42, 44. The third airflow direction element 38 may be positioned at its vane shaft 22 along a third vane element axis 42. The fourth airflow direction element 40 may be positioned at its vane shaft 22 along a fourth vane element axis 44.

In one example embodiment, the respective vane shafts 22 of the first plurality of airflow direction elements 12 may be positioned substantially parallel to the vane shafts of each of the other of the first plurality of airflow direction elements 12. As shown in FIG. 1, the vane shaft 22 of the first airflow direction element 18 may be positioned substantially parallel to the vane shaft 22 of the second airflow direction element 20. In the same example embodiment, the respective vane shafts 22 of the second plurality of airflow direction elements 14 may be positioned substantially parallel to the vane shaft 22 of each of the other the second plurality of airflow direction elements 14. As shown in FIG. 1, the vane shaft 22 of the third airflow direction element 38 may be positioned substantially parallel to the vane shaft 22 of the fourth airflow direction element 40.

As further shown in the example embodiment of FIG. 1, the vane shafts 22 of each of the first plurality of airflow direction elements 12 and may be positioned substantially perpendicular to the vane shafts 22 of each of the second plurality of airflow direction elements 14. More particularly, the vane shaft 22 of the first airflow direction element 18 is positioned substantially parallel to the vane shaft 22 of the second airflow direction element 20 and further positioned substantially perpendicular to the vane shafts 22 of each of the third airflow direction element 38 and the fourth airflow direction element 40. The vane shaft 22 of the second airflow direction element 20 is positioned substantially parallel to the vane shaft of the first airflow direction element 18 and further positioned substantially perpendicular to the vane shafts 22 of each of the third airflow direction element 38 and the fourth airflow direction element 40. The vane shaft 22 of the third airflow direction element 38 is positioned substantially parallel to the vane shaft 22 of the fourth airflow direction element 40 and further positioned substantially perpendicular to the vane shafts 22 of each of the first airflow direction element 18 and the second airflow direction element 20. The vane shaft 22 of the fourth airflow direction element 40 is positioned substantially parallel to the vane shaft 22 of the third airflow direction element 38 and further positioned substantially perpendicular to the vane shafts 22 of each of the first airflow direction element 18 and the second airflow direction element 20.

When the vane shafts 22 of each of the respective first airflow direction element 18, the second airflow direction element 20, the third airflow direction element 38, the fourth airflow direction element 40 are positioned as shown in the example embodiment of FIG. 1, each of the detents 32 defined by the vane shaft 22 of the first airflow direction element 18 and the detents 32 defined by the vane shaft 22 of the second airflow direction element 20 are configured to bypass and receive the vane shaft 22 of one of the respective second plurality of airflow direction elements 14. More particularly, each of the detents 32 is configured to bypass and receive the vane shaft 22 of one of the third airflow direction element 38 and the fourth airflow direction element 40.

The actuation system 16 is configured to control the position of the vane elements 26 of each of the airflow direction elements 18, 20, 38, 40 of the first plurality of airflow direction elements 12 and the second plurality of airflow direction elements 14. The actuation system 16 may include at least a drive element 46 and a driven element 48. The drive element 46 may be of a spherical shape (as shown), an elliptical shape, or the like. The drive element 46 may have a centrally located fixed drive element interior point 25 about which the drive element 46 may rotate. The drive element 46 may be composed of a frictional material such as a rubberized material. The drive element 46 may also be composed of any other suitable material and coated in frictional material, such as a rubberized material. The drive element 46 is configured to be directionally actuated and/or rotated by a user, i.e., rotated or scrolled by the user in a desired airflow direction.

Analogously, the driven element 48 may be formed in a spherical shape (as shown), an elliptical shape, or the like. The driven element 48 may also have a centrally located fixed driven element interior point 27 about which the driven element 48 may rotate. The driven element 48 may be composed of a frictional material, such as a rubberized material or the like. The driven element 48 may also be composed of any other suitable material and coated in a frictional material, such as a rubberized material.

Referring to FIGS. 1-3, the airflow outlet 10 may further include an airflow outlet housing 56 configured to house each of the first plurality of airflow direction elements 12, the second plurality of airflow direction elements 14, and the actuation system 16. The airflow outlet 10 may be affixed within the passenger compartment 13 of a vehicle 11 via a trim piece 58. The trim piece 58 may be snap fit to the vehicle interior and the airflow outlet housing 56 to secure the outlet 10 within the passenger compartment 13.

The airflow outlet housing 56 may have an outer portion 60 and an inner portion 62. The outer portion 60 may form the periphery of the airflow outlet 10. The outer portion 60 may be configured to receive the first end 28 and second end 30 of each of the vane shafts 22 of the respective airflow direction elements 18, 20, 38, 40. The outer portion 60 thereby translationally fixes each of the airflow direction elements 18, 20, 38, 40 in place and/or holds each of the airflow direction elements 18, 20, 38, 40 horizontally and vertically stationary, while still allowing rotation about the respective vane element axis 34, 36, 42, 44.

The inner portion 62 and the outer portion 60 of the housing 56 may be integrally connected with a plurality of supports 64. Each of the supports 64 may define an opening therein 65, that allows directed air to pass therethrough. This opening 65 may allow for a consistent volume of airflow in all operating positions of the airflow direction elements 18, 20, 38, 40.

The inner portion 62 may form the interior of the airflow outlet housing 56. The inner portion may further define a roller cradle 68. The roller cradle 68 is configured to house each of the drive element 46 and the driven element 48. The drive element 46 and the driven element 48 may be aligned within the roller cradle 68 along an actuation system axis 70, such that the drive element fixed interior point 25 and the driven element fixed interior point 27 are disposed on the actuation system axis 70. The drive element 46 and the driven element 48 are housed within the roller cradle 68, such that each of the drive element 46 and the driven element 48 respectively is translationally stationary but freely rotatable about its respective interior point 25, 27. The drive element 46 and the driven element 48 are aligned and positioned within the roller cradle 68 such that the drive element 46 and the driven element 48 are disposed adjacent to one another and are further engaged with one another, such that the rotation of the drive element 46 in a first direction results in a substantially equivalent rotation of the driven element 48 in a second direction, which is rotationally opposite of the first direction.

The engagement between the drive element 46 and the driven element 48 may be a mechanical engagement such as gearing, a frictional engagement between the frictional material of the drive element 46 and the frictional material of the driven element 48, or a similar mechanical-type engagement. More particularly, in one example embodiment, each of the drive element 46 and the driven element 48 may be spherical in shape and substantially the same size. In such an embodiment, the drive element 46 is disposed adjacent to and engaged with the driven element 48 along the actuation system axis 70 such that the drive element 46 and driven element 48 are frictionally engaged with one another at an interaction point 72. However, the drive element 46 and the driven element 48 do not engage the inner portion 62 of the housing 56. In some embodiments there may be a defined gap between each of the driven element 48 and the inner portion 62 and the drive element 46 and the inner portion 62.

Figure 4:
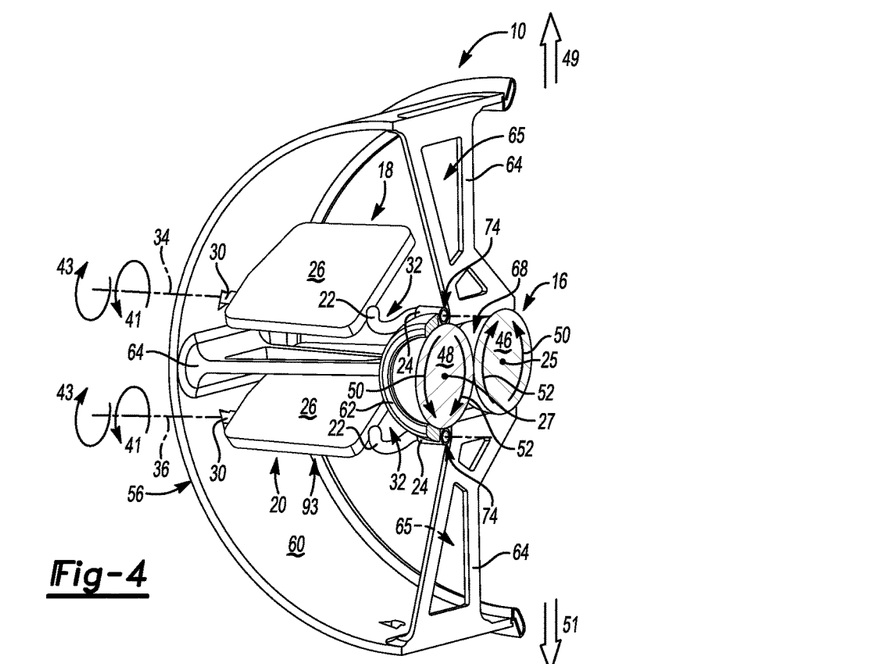
FIG. 4 is a schematic, vertical partially cross-sectional perspective view of the airflow outlet of the present disclosure.
Figure 6:
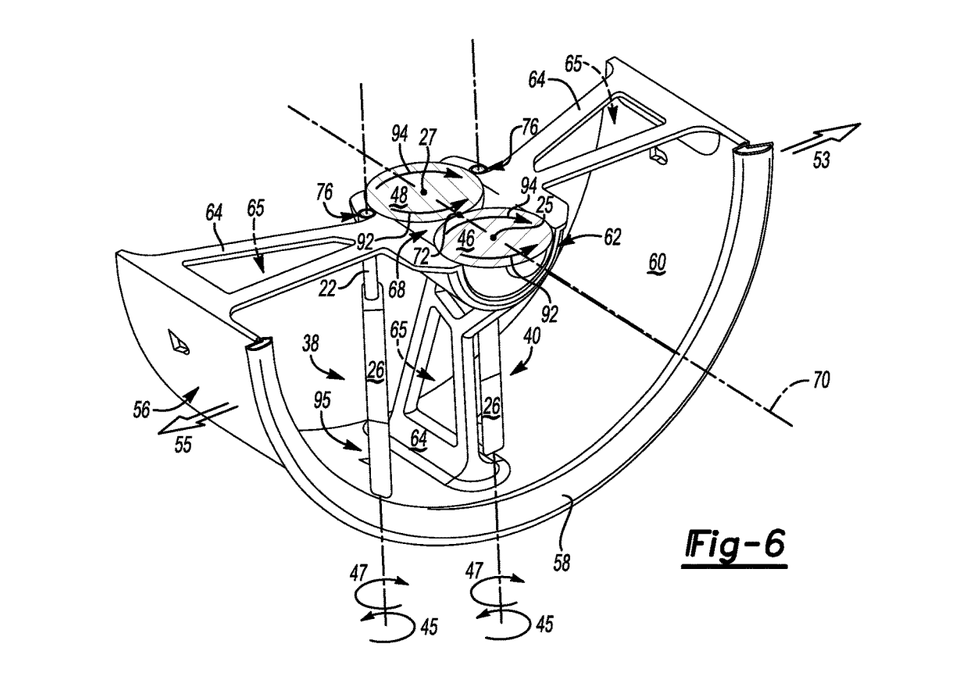
FIG. 6 is a schematic, horizontal, partially cross-sectional perspective view of the airflow outlet of the present disclosure.

The inner portion 62 of the outlet housing 56 may define a first plurality of slots 74 (best shown in FIGS. 3 and 4) and a second plurality of slots 76 (best shown in FIGS. 2 and 6). As best shown in FIGS. 3 and 4, each of the first plurality of slots 74 is configured to receive the vane shaft 22 of one of the first plurality of airflow direction elements 12. More particularly, one of the first plurality of slots 74 is configured to receive the vane shaft 22 of the first airflow direction element 18 and one of the first plurality of slots 74 is configured to receive the vane shaft 22 of the second airflow direction element 20. The vane shaft 22 of the first airflow direction element 18 is received by one of the first plurality of slots 74 at its respective vane shaft roller 24. Analogously, the vane shaft 22 of the second airflow direction element 20 is received by one of the first plurality of slots 74 at its respective vane shaft roller 24. When the vane shaft 22 of the respective airflow direction element 18, 20 is received by one of the first plurality of slots 74, the respective vane shaft 22 is placed in contact with and is thereby operatively engaged with the driven element 48 at the vane shaft roller 24. In one example embodiment, the frictional material of the vane shaft roller 24 frictionally engages with the frictional material of the driven element 48. The frictional material of each of the vane shaft roller 24 and the driven element 48 may be rubberized materials or the like.

As best shown in FIGS. 2 and 6, each of the second plurality of slots 76 is configured to receive the vane shaft 22 of one of the second plurality of airflow direction elements 14. More particularly, one of the second plurality of slots 76 is configured to receive the vane shaft 22 of the third airflow direction element 38 and one of the second plurality of slots 76 is configured to receive the vane shaft 22 of the fourth airflow direction element 40. The vane shaft 22 of the third airflow direction element 38 is received by one of the second plurality of slots 76 at its respective vane shaft roller 24. Analogously, the vane shaft 22 of the fourth airflow direction element 40 is received by one of the second plurality of slots 76 at its respective vane shaft roller 24. When the vane shaft 22 of the respect airflow direction element 38, 40 is received by one of the second plurality of slots 76, the respective vane shaft 22 is placed in contact with and is thereby operatively engaged with the driven element 48 at the vane shaft roller 24. In one example embodiment, the frictional material of the vane shaft roller 24 frictionally engages with the frictional materials of the driven element 48. The frictional material of each of the vane shaft roller 24 and the driven element 48 may be rubberized materials or the like.

As shown by example in FIGS. 4-8D, the user or vehicle occupant may desire to direct airflow through the airflow outlet 10 in a variety of airflow directions represented by arrows 49, 51, 53, 55, 100, 102, 104, and 106. Stated another way, the user or vehicle occupant may desire to direct airflow through the airflow outlet 10 upward (FIG. 5A), downward (FIG. 5B), right (FIG. 7A), left (FIG. 7B), or diagonally (FIGS. 8A-8D). Thus, the at least one vane element 26 of each of the first plurality of airflow direction elements 12 and the at least one vane element 26 of each of the second plurality of airflow direction elements 14 must be actuated to an operating position via the actuation system 16 to effectuate the desired airflow direction. As such, the operating position 93, 95 of the at least one vane element 26 of each of the respective airflow direction elements 18, 20, 38, 40 defines an airflow direction through the airflow outlet 10. More particularly, a directional actuation and/or rotation of the drive element 46 in a specified direction results in a substantially equivalent rotation of the driven element 48 in a rotationally opposite direction. Such a rotation of the driven element 48 results in a proportional rotation of the vane shafts 22 in the direction of rotation of the drive element 46 to thereby actuate the respective vane elements 26 to the desired operating position 93, 95.

Figure 5A:
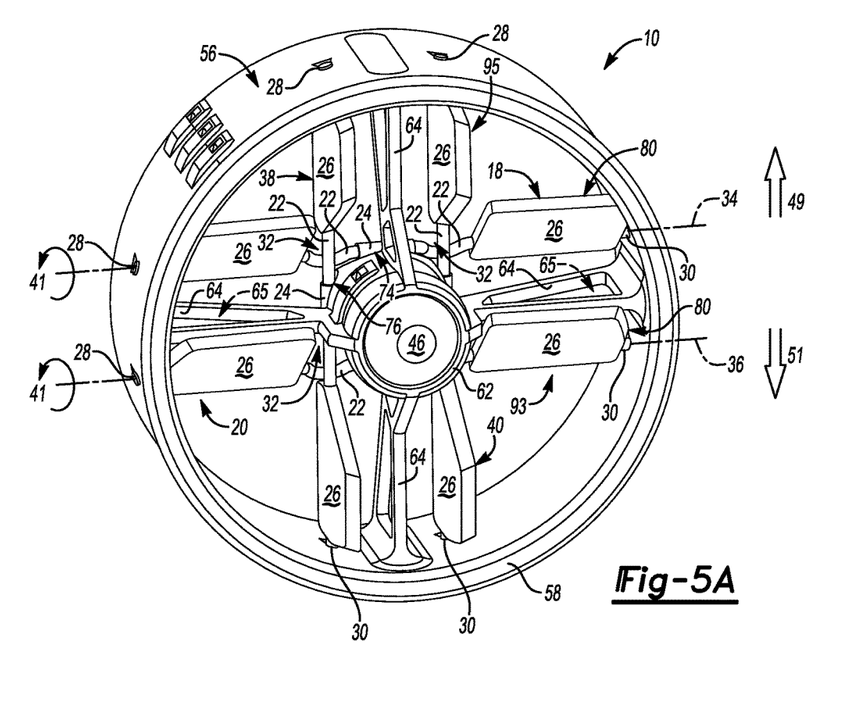
FIG. 5A is a schematic perspective view of the airflow outlet of the present disclosure wherein the at least one vane element of each of the first plurality of airflow direction elements is actuated to a first vertical rotation position.

In one example embodiment shown in FIGS. 4 and 5A, the user or vehicle occupant may desire airflow in the direction represented by arrow 49. To achieve airflow in the direction represented by arrow 49, the drive element 46 may be rotated in a direction represented, for this example, by arrow 50. This rotation of the drive element 46 in the direction represented by arrow 50 results in a rotation of the driven element 48 in a rotationally opposite direction represented, for this example, by arrow 52. The rotation of the drive element 46 and the driven element 48 as described above, causes a resultant vane shaft rotation of each of the vane shafts 22 engaged therewith, namely, the vane shaft 22 of the first airflow direction element 18 and the vane shaft 22 of the second airflow direction element 20, in the direction represented by arrow 41.

Figure 5B:
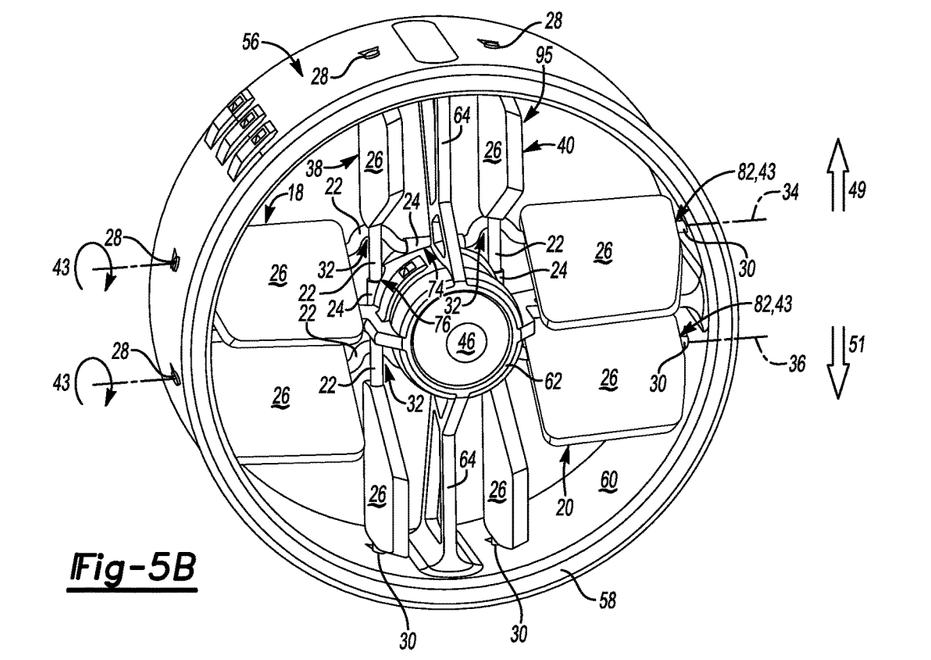
FIG. 5B is a schematic perspective view of the airflow outlet of the present disclosure wherein the at least one vane element of each of the first plurality of airflow direction elements is actuated to a second vertical rotation position.

In the same example, as shown in FIGS. 4 and 5B, the user or vehicle occupant may desire airflow in the direction represented by arrow 51. To achieve airflow in the direction represented by arrow 51, the drive element 46 may be rotated in the direction represented by arrow 52. This rotation of the drive element 46 in the direction represented by arrow 52 results in a rotation of the driven element 48 in the rotationally opposite direction, for this example, the direction shown by arrow 50. The rotation of the drive element 46 and the driven element 48 as described above, causes a resultant vane shaft rotation of each of the vane shafts 22 engaged therewith, namely the vane shaft 22 of the first airflow direction element 18 and the vane shaft 22 of the second airflow direction element 20, in the direction represented by arrow 43.

The resultant rotation of the of the respective vane shafts 22 of the first airflow direction element 18 and the second airflow direction element 20 defines a proportional rotation of and actuates the associated vane element 26 of each of the airflow direction elements 18, 20 to an operating position 93.

As schematically shown in FIGS. 4, 5A, and 5B, the operating position of the first plurality of airflow direction elements 12 is a first operating position 93 defined between a first vertical rotation position 80 (FIG. 4A) and a second vertical rotation position 82 (FIG. 4B). In this example, the first vertical rotational position 80 (FIG. 4A) is defined as a positive 35° rotation of the vane element 26 of the first airflow direction element 18 about the first vane element axis 34 and a positive 35° rotation of the vane element 26 of the second airflow direction element 20 about the second vane element axis 36. Simply stated, the first vertical rotation position 80 is a 35° rotation of the vane elements 26 of the first plurality of airflow direction elements 12 in the direction represented by arrow 49, resultant from a rotation of the drive element 46 in the direction represented by arrow 50 and a rotation of the respective vane shafts 22 of each of the first airflow direction element 18 and the second airflow direction element 20 in the direction represented by arrow 41.

In this example, the second vertical rotational position 82 (FIG. 4B) is defined as a negative 35° rotation of the vane element 26 of the first airflow direction element 18 about the first vane element axis 34 and a negative 35° rotation of the vane element 26 of the second airflow direction element 20 about the second vane element axis 36 as shown in FIG. 4B. Simply stated, the second vertical rotation position 82 is a 35° rotation of the vane elements 26 of the first plurality of airflow direction elements 12 in the direction represented by arrow 51, resultant from a rotation of the drive element 46 in the direction represented by arrow 52 and a rotation of the respective vane shafts 22 of each of the first airflow direction element 18 and the second airflow direction element 20 in the direction represented by arrow 43.

Figure 7A:
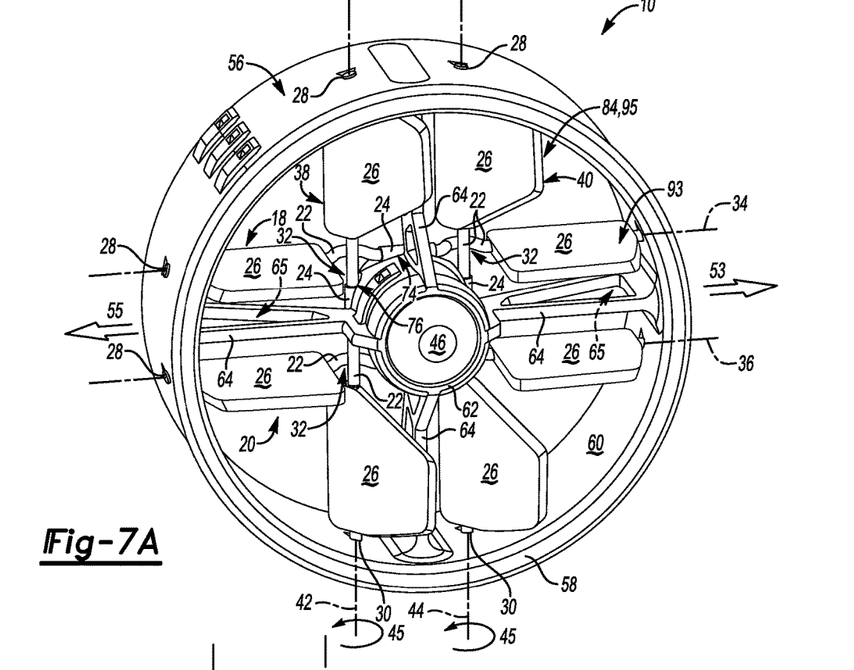
FIG. 7A is a schematic perspective view of the airflow outlet of the present disclosure wherein the at least one vane element of each of the second plurality of airflow direction elements is actuated to a first horizontal rotation position.

In the same example, as shown in FIGS. 6 and 7A, the user or vehicle occupant may desire airflow in the direction represented by arrow 53. To achieve airflow in the direction represented by arrow 53, the drive element 46 may be rotated in the direction represented by arrow 92. This rotation of the drive element 46 in the direction represented by arrow 92 results in a rotation of the driven element 48 in the rotationally opposite direction, for this example, the direction shown by arrow 94. The rotation of the drive element 46 and the driven element 48 as described above, causes a resultant vane shaft rotation of each of the vane shafts 22 engaged therewith, namely the vane shaft 22 of the third airflow direction element 38 and the vane shaft 22 of the fourth airflow direction element 40, in the direction represented by arrow 45.

Figure 7B:
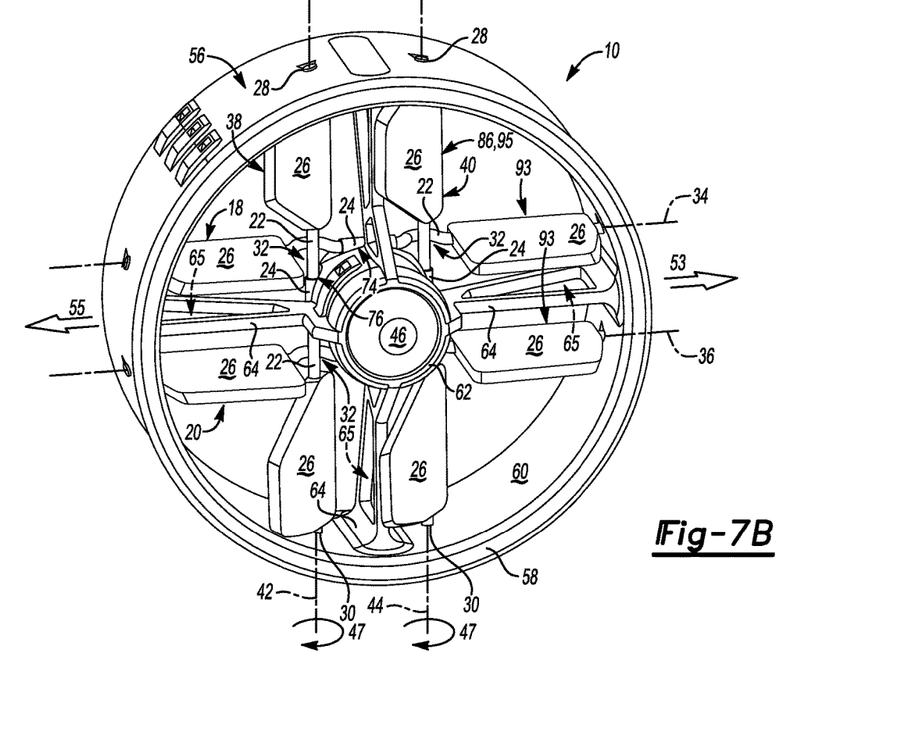
FIG. 7B is a schematic perspective view of the airflow outlet of the present disclosure wherein the at least one vane element of each of the second plurality of airflow direction elements is actuated to a second horizontal rotation position.

In the same example, as shown in FIGS. 6 and 7B, the user or vehicle occupant may desire airflow in the direction represented by arrow 53. To achieve airflow in the direction represented by arrow 55, the drive element 46 may be rotated in the direction represented by arrow 94. This rotation of the drive element 46 in the direction represented by arrow 94 results in a rotation of the driven element 48 in the rotationally opposite direction, for this example, the direction shown by arrow 92. The rotation of the drive element 46 and the driven element 48 as described above, causes a resultant vane shaft rotation of each of the vane shafts 22 engaged therewith, namely the vane shaft 22 of the third airflow direction element 38 and the vane shaft 22 of the fourth airflow direction element 40, in the direction represented by arrow 47.

The resultant rotation of the respective vane shafts 22 of the third airflow direction element 38 and the fourth airflow direction element 40 defines a proportional rotation of and actuation of the associated vane element 26 of each of the airflow direction elements 38, 40 to an operating position 95.

As schematically shown in FIGS. 6, 7A, and 7B, the operating position occupied by the second plurality of airflow direction elements 14 is a second operating position 95 defined between a first horizontal rotation position 84 (FIG. 6A) and a second horizontal rotation position 86 (FIG. 6B). In one example, the first horizontal rotation position 84 is defined as a positive 35° rotation of the vane element 26 of the third airflow direction element 38 about the third vane element axis 42 and a positive 35° rotation of the vane element 26 of the fourth airflow direction element 40 about the second vane element axis 44 as shown in FIG. 6A. Simply stated, the first horizontal rotation position 84 is a 35° rotation of the vane elements 26 of the second plurality of airflow direction elements 14 in the direction represented by arrow 53, resultant from a rotation of the drive element 46 in the direction represented by arrow 92 and a rotation of the respective vane shafts 22 of each of the third airflow direction element 38 and the fourth airflow direction element 40 in the direction represented by arrow 45.

In the same example, the second horizontal rotational position 86 is defined as a negative 35° rotation of the vane element 26 of the third airflow direction element 38 about the third vane element axis 42 and a negative 35° rotation of the vane element 26 of the fourth airflow direction element 40 about the fourth vane element axis 44 as shown in FIG. 6B. Simply stated, the second horizontal rotation position 86 is a 35° rotation of the vane elements 26 of the second plurality of airflow direction elements 14 in the direction represented by arrow 55, resultant from a rotation of the drive element 46 in the direction represented by arrow 94 and a rotation of the respective vane shafts 22 of each of the third airflow direction element 38 and the fourth airflow direction element 40 in the direction represented by arrow 47.

Particularly, with respect to one specific embodiment of the example airflow outlet 10, the radius of the drive element 46 and the driven element 48 are substantially equivalent. The radius of each of the drive element 46 and the driven element 48 is approximately 6.5 times the radius of the respective vane shafts 22 of each of the first plurality of airflow direction elements 12 and the second plurality of airflow direction elements 14.

As such, a positive 35° desired rotation of the at least one vane element 26 of each of the first airflow direction element 18 and the second airflow direction element 20 to a first vertical rotation position 80 (shown in FIG. 4A) is resultant of an approximate 5.2° rotation of the drive element 46 in the direction represented by arrow 50 (FIG. 3). Analogously, a negative 35° desired rotation of the at least one vane element 26 of each of the first airflow direction element 18 and the second airflow direction element 20 to a second vertical rotation position 82 (shown in FIG. 4B) is resultant of an approximate 5.2° rotation of the drive element 46 in the direction represented by arrow 52 (FIG. 3).

Further, a positive 35° desired rotation of the at least one vane element 26 of each of the third airflow direction element 38 and the fourth airflow direction element 40 to a first horizontal rotation position 84 (shown in FIG. 6A) is resultant of an approximate 5.2° rotation of the drive element 46 in the direction represented by arrow 92 (FIG. 5). Analogously, a negative 35° desired rotation of the at least one vane element 26 of each of the third airflow direction element 38 and the fourth airflow direction element 40 to a second horizontal rotation position 86 (shown in FIG. 6B) is resultant of an approximate 5.2° rotation of the drive element 46 in the direction represented by arrow 94 (FIG. 5).

In the same example embodiment, the user or vehicle occupant may desire to direct airflow in one of the directions represented in FIGS. 8A-8D by arrows 100, 102, 104, 106. To achieve a desired airflow direction represented by arrow 100, the at least one vane element 26 of each of the first plurality of airflow direction elements 12 and each of the second plurality of airflow direction elements 14 may occupy the operating positions 93, 95 shown in FIG. 8A. As shown schematically in FIG. 8A, the vane elements 26 of each of the first plurality of airflow direction elements 12 is actuated to the first vertical rotation position 80 e.g., a positive 35° desired rotation, and the vane elements 26 of each of the second plurality of airflow direction elements is actuated to the first horizontal rotation position 84 e.g., a positive 35° desired rotation, as a result of an approximate 7.9° rotation of the drive element 46 in the direction represented by arrow 108.

Figure 8A:
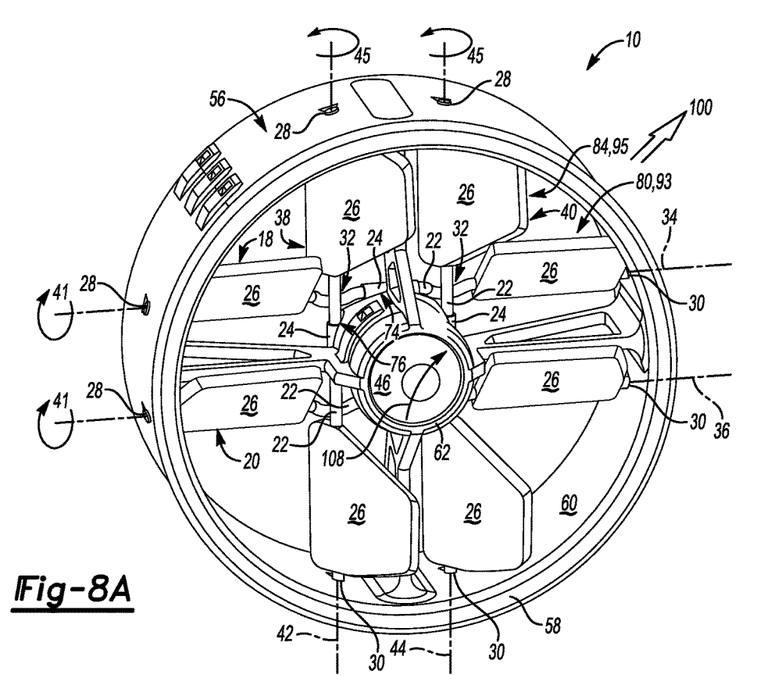
FIG. 8A is a schematic, perspective view of an example airflow outlet wherein the drive element has been actuated in the direction indicated by arrow 108 in order to position the first plurality of airflow direction elements and the second plurality of airflow direction elements, such that airflow through the airflow outlet is directed in the direction indicated by arrow 100.
Figure 8B:
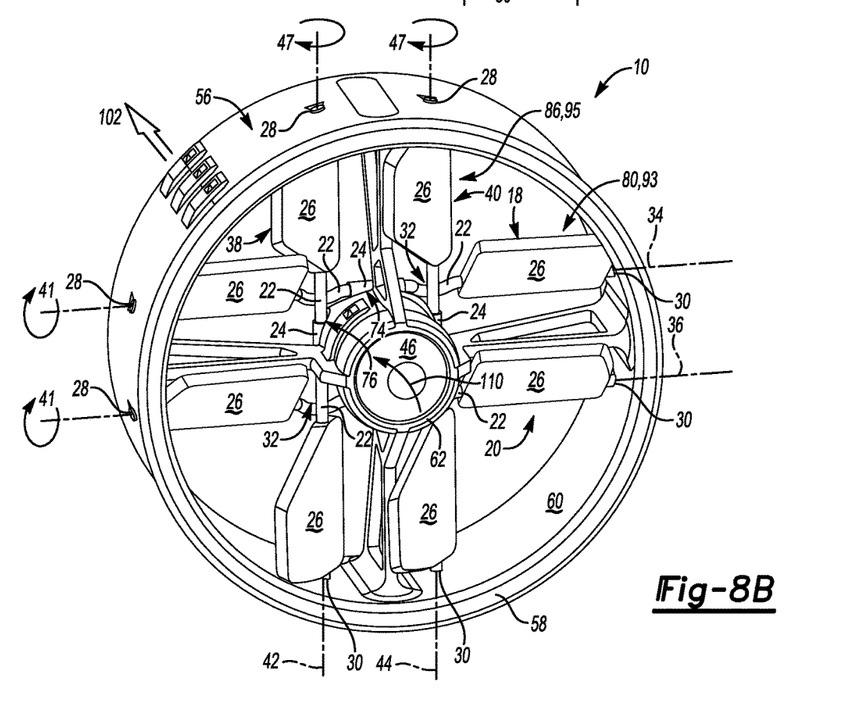
FIG. 8B is a schematic, perspective view of an example airflow outlet wherein the drive element has been actuated in the direction indicated by arrow 110 in order to position the first plurality of airflow direction elements and the second plurality of airflow direction elements, such that airflow through the airflow outlet is directed in the direction indicated by arrow 102.

To achieve a desired airflow direction represented by arrow 102, the at least one vane element 26 of each of the first plurality of airflow direction elements 12 and each of the second plurality of airflow direction elements 14 may occupy the operating positions 93, 95 shown in FIG. 8B. As shown schematically in FIG. 8B, the at least one vane element 26 of each of the first plurality of airflow direction elements 12 is actuated to the first vertical rotation position 80, e.g., a positive 35° desired rotation, and the at least one vane element 26 of each of the second plurality of airflow direction elements is actuated to the second horizontal rotation position 86, e.g., complete a negative 35° desired rotation, as a result of an approximate 7.9° rotation of the drive element 46 in direction represented by arrow 110.

Figure 8C:
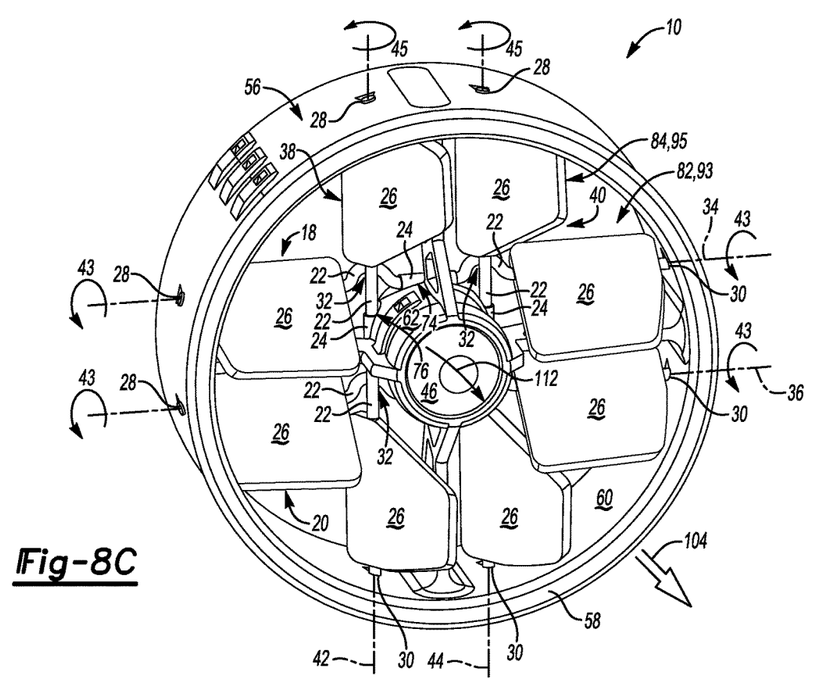
FIG. 8C is a schematic, perspective view of an example airflow outlet wherein the drive element has been actuated in the direction indicated by arrow 112 in order to position the first plurality of airflow direction elements and the second plurality of airflow direction elements, such that airflow through the airflow outlet is directed in the direction indicated by arrow 104.

To achieve a desired airflow direction represented by arrow 104, the at least one vane element 26 of each of the first plurality of airflow direction elements 12 and each of the second plurality of airflow direction elements 14 may occupy the operating positions 93, 95 shown in FIG. 8C. As shown schematically in FIG. 8C, the at least one vane element 26 of each the first plurality of airflow direction elements 12 is actuated to the second vertical rotation position 82, e.g., a negative 35° desired rotation, and the at least one vane elements 26 of each of the second plurality of airflow direction elements is actuated to the first horizontal rotation position 84, e.g., a positive 35° desired rotation, as a result of an approximate 7.9° rotation of the drive element 46 in the direction represented by arrow 112.

Figure 8D:
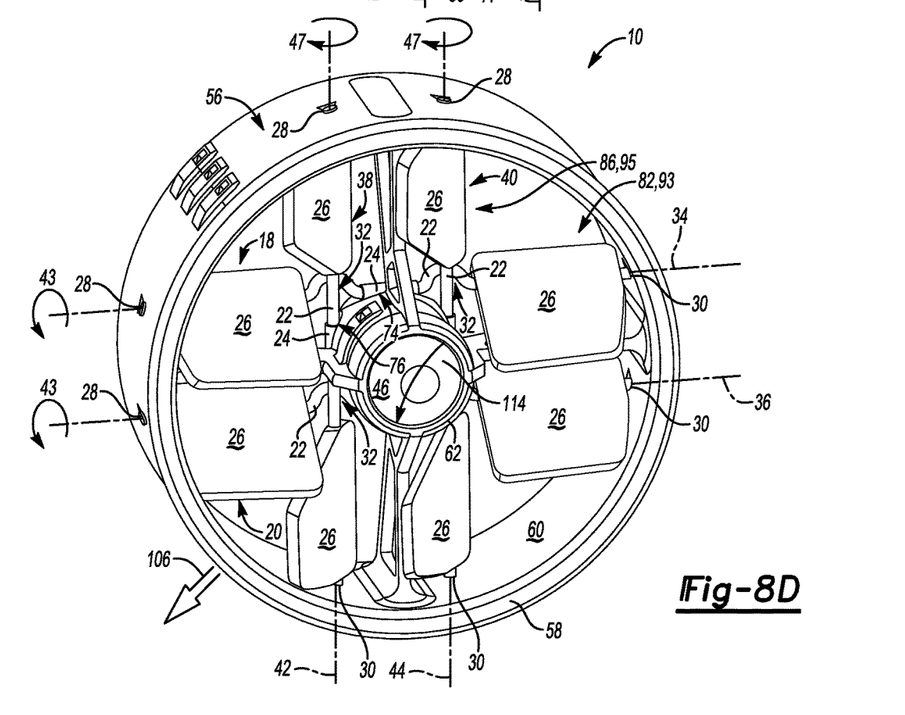
FIG. 8D is a schematic, perspective view of an example airflow outlet wherein the drive element has been actuated in the direction indicated by arrow 114 in order to position the first plurality of airflow direction elements and the second plurality of airflow direction elements, such that airflow through the airflow outlet is directed in the direction indicated by arrow 106.

To achieve a desired airflow direction represented by arrow 106, the at least one vane element 26 of each of the first plurality of airflow direction elements 12 and each of the second plurality of airflow direction elements 14 may occupy the operating positions 93, 95 shown in FIG. 8D. As shown schematically in FIG. 8D, the at least one vane element 26 of each of the first plurality of airflow direction elements 12 are actuated to the second vertical rotation position 82, e.g., a negative 35° desired rotation, and the at least one vane element 26 of each of the second plurality of airflow direction elements is actuated to the second horizontal rotation position 86, a negative 35° desired rotation as a result of an approximate 7.9° rotation of the drive element 46 in the direction represented by arrow 114.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An airflow outlet comprising:
 a first airflow direction element positioned along a first vane element axis and a second airflow direction element positioned along a second vane element axis, wherein each of the respective first and second airflow direction elements includes:
  a vane shaft having a first end and a second end, wherein the vane shaft of the first air flow direction element is positioned substantially parallel to the vane shaft of the second airflow direction element;
  a vane shaft roller composed of a rubberized material, the vane shaft roller being disposed about the vane shaft and positioned intermediately between the vane shaft first end and the vane shaft second end; and
  a pair of vane elements integrally coupled with and disposed along the vane shaft between the first end and the second end, such that one vane element is disposed between the first end and the vane shaft roller and another vane element is disposed between the second end and the vane shaft roller;
 a third airflow direction element positioned along a third vane element axis and a fourth airflow direction element positioned along a fourth vane element axis, wherein each of the respective third and fourth airflow direction elements includes:
  a vane shaft having a first end and a second end, wherein the vane shaft of each of the third airflow direction element and the fourth airflow direction element is positioned substantially perpendicular to the vane shaft of each of the first and second airflow direction elements;
  a vane shaft roller composed of a rubberized material, the vane shaft roller being disposed about the vane shaft and positioned intermediately between the vane shaft first end and the vane shaft second end; and
  a pair of vane elements integrally coupled with and disposed along the vane shaft between the first end and the second end, such that one vane element is disposed between the first end and the vane shaft roller and one vane element is disposed between the second end and the vane shaft roller;
 an actuation system configured to control a position of the vane elements of each of the airflow direction elements, the actuation system including:
  a spherical drive element composed of a rubberized material and rotatable about a drive element interior center point; and
  a spherical driven element composed of a rubberized material and rotatable about a driven element interior center point, the spherical driven element engaged with the spherical drive element and further engaged with the vane shaft roller of each of the airflow direction elements
 an airflow outlet housing configured to house each of the first airflow direction element, the second airflow direction element, the third airflow direction element, the fourth airflow direction element, and the actuation system, wherein the airflow outlet housing includes:
  an inner portion defining a roller cradle configured to house each of the drive element and the driven element therein, the inner portion further defining a plurality of slots, each slot being configured to receive the vane shaft of one of the first airflow direction element, the second airflow direction element, the third airflow direction element, and the fourth airflow direction element at the vane shaft roller, to thereby engage each of the airflow direction elements and the driven element;
  an outer portion operatively connected to the inner portion with a plurality of supports, wherein the first end and second end of the vane shaft of each of the airflow direction elements are coupled to the outer portion; and
 wherein a rotation of the drive element about the drive element center point causes a proportional rotation of the vane elements of each of the airflow direction elements to an operating position, such that the operating position of the vane elements defines an airflow direction through the airflow outlet.

2. The airflow outlet of claim 1 wherein the rotation of the drive element in a first direction results in a rotation of the driven element in a rotationally opposite second direction, such that the rotation of the driven element in the second direction causes a resultant vane shaft rotation of the vane shaft of each of the first airflow direction element, the second airflow direction element, the third airflow direction element, and the fourth airflow direction element; and wherein the proportional rotation of the vane elements of each of the first airflow direction element, second airflow direction element, third airflow direction element, and fourth airflow direction element is defined by the resultant vane shaft rotation of the vane shaft of the same airflow direction element.

3. The airflow outlet of claim 2 wherein the rotation of the drive element in the first direction is substantially equivalent to the rotation of the driven element in the rotationally opposite second direction.

4. The airflow outlet housing of claim 2 wherein the vane shaft of each of the first airflow direction element and the second airflow direction element defines at least two detents, each detent configured to bypass and receive the vane shaft of one of the third airflow direction element and the fourth airflow direction element.

5. The airflow outlet of claim 2 wherein the operating position occupied by the vane elements of each of the first airflow direction element and the second airflow direction element is a first operating position defined between a first vertical rotation position and a second vertical rotation position; and wherein the operating position occupied by the vane elements of each of the third airflow direction element and the fourth airflow direction element is a second operating position defined between a first horizontal rotational position and a second horizontal rotation position.

6. The airflow outlet of claim 5 wherein the first vertical rotational position is defined as a positive 35° rotation of the vane element of the first airflow direction element about the first vane element axis and a positive 35° rotation of the vane element of the second airflow direction element about the second vane element axis; and wherein the second vertical rotational position is defined as a negative 35° rotation of the vane element of the first airflow direction element about the first vane element axis and a negative 35° rotation of the vane element of the second airflow direction element about the second vane element axis.

7. The airflow outlet of claim 6 wherein the first horizontal rotational position is defined as a positive 35° rotation of the vane element of the third airflow direction element about the third vane element axis and a positive 35° rotation of the vane element of the fourth airflow direction element about the fourth vane element axis; and wherein the second horizontal rotational position is defined as a negative 35° rotation of the vane element of the third airflow direction element about the third vane element axis and a negative 35° rotation of the vane element of the fourth airflow direction element about the fourth vane element axis.

8. The airflow outlet of claim 1 wherein the roller cradle is configured to align the drive element and the driven element therein along an actuation system axis, such that the drive element interior center point and the driven element interior center point are disposed on the actuation system axis.

9. A vehicle having a passenger compartment, the vehicle comprising:
 a plurality of airflow outlets placed within the passenger compartment to facilitate heating, cooling, and ventilation of the passenger compartment of the vehicle, each of the plurality of airflow outlets including:
  a first airflow direction element positioned along a first vane element axis and a second airflow direction element positioned along a second vane element axis, each of the respective first and second airflow direction elements including:
   a vane shaft having a first end and a second end, wherein the vane shaft of the first air flow direction element is positioned substantially parallel to the vane shaft of the second airflow direction element;
   a vane shaft roller composed of a rubberized material, the vane shaft roller being disposed about the vane shaft and positioned intermediately between the vane shaft first end and the vane shaft second end; and
   a pair of vane elements integrally coupled with and disposed along the vane shaft between the first end and the second end, such that one vane element is disposed between the first end and the vane shaft roller and one vane element is disposed between the second end and the vane shaft roller;
  a third airflow direction element positioned along a third vane element axis and a fourth airflow direction element positioned along a fourth vane element axis, each of the respective third and fourth airflow direction elements including:
   a vane shaft having a first end and a second end, wherein the vane shaft of each of the third airflow direction element and the fourth airflow direction element are positioned substantially perpendicular to the vane shaft of each of the first and second airflow direction elements;
   a vane shaft roller composed of a rubberized material, the vane shaft roller being disposed about the vane shaft and positioned intermediately between the vane shaft first end and the vane shaft second end; and
   a pair of vane elements integrally coupled with and disposed along the vane shaft between the first end and the second end, such that one vane element is disposed between the first end and the vane shaft roller and one vane element is disposed between the second end and the vane shaft roller;
  an actuation system configured to control a position of the vane elements of each of the airflow direction elements, the actuation system including:
   a spherical drive element composed of a rubberized material and rotatable about a drive element center point;
   a spherical driven element composed of a rubberized material and rotatable about a driven element center point, the spherical driven element being engaged with the spherical drive element and further engaged with the vane shaft roller of each of the airflow direction elements;
  an airflow outlet housing configured to house each of the first airflow direction element, the second airflow direction element, the third airflow direction element, the fourth airflow direction element, and the actuation system, the airflow outlet housing including:
   an inner portion defining a roller cradle configured to house each of the drive element and the driven element therein, the inner portion further defining a plurality of slots, each slot being configured to receive the vane shaft of one of the first airflow direction element, the second airflow direction element, the third airflow direction element, and the fourth airflow direction element at the vane shaft roller, to thereby engage each of the airflow direction elements and the driven element;
   an outer portion operatively connected to the inner portion with a plurality of supports, wherein the first end and second end of the vane shaft of each of the airflow direction elements are coupled to the outer portion; and
  wherein a rotation of the drive element about the drive element center point causes a proportional rotation of the vane elements of the each of the airflow direction elements to an operating position, such that the operating position of the vane elements defines an airflow direction through the airflow outlet.

10. The vehicle of claim 9 wherein the rotation of the drive element in a first direction results in a rotation of the driven element in a rotationally opposite second direction, such that the rotation of the driven element in the second direction causes a resultant vane shaft rotation of the vane shaft of each of the first airflow direction element, the second airflow direction element, the third airflow direction element, and the fourth airflow direction element; and wherein the proportional rotation of the vane elements of each of the first airflow direction element, second airflow direction element, third airflow direction element, and fourth airflow direction element is defined by the resultant vane shaft rotation of the vane shaft of the same airflow direction element.

11. The vehicle of claim 10 wherein:
the operating position occupied by the vane elements of the first airflow direction element is defined between a positive 35° rotation of the vane elements of the first airflow direction element about the first vane element axis and a negative 35° rotation of the vane elements of the first airflow direction element about the first vane element axis;
the operating position occupied by the vane elements of the second airflow direction element is defined between a positive 35° rotation of the vane elements of the second airflow direction element about the second vane element axis and a negative 35° rotation of the vane elements of the second airflow direction element about the second vane element axis;
the operating position occupied by the vane elements of the third airflow direction element is defined between a positive 35° rotation of the vane elements of the third airflow direction element about the third vane element axis and a negative 35° rotation of the vane elements of the third airflow direction element about the third vane element axis; and
the operating position occupied by the vane elements of the fourth airflow direction element is defined between a positive 35° rotation of the vane elements of the fourth airflow direction element about the fourth vane element axis and a negative 35° rotation of the vane elements of the fourth airflow direction element about the fourth vane element axis.

* * * * *